Nov. 24, 1936.  W. E. LAMBERT  2,062,227
CONVEYING EQUIPMENT
Filed July 9, 1934  2 Sheets-Sheet 1
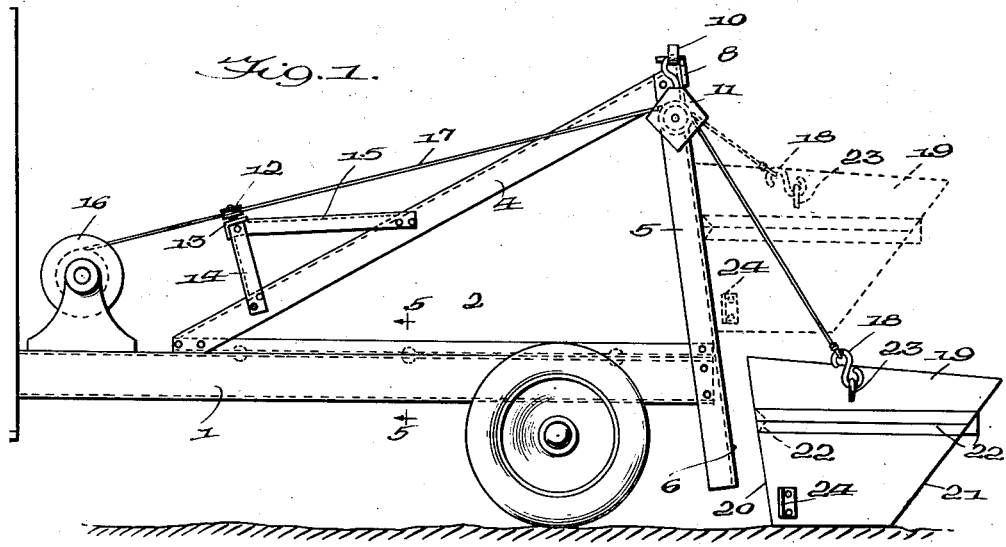
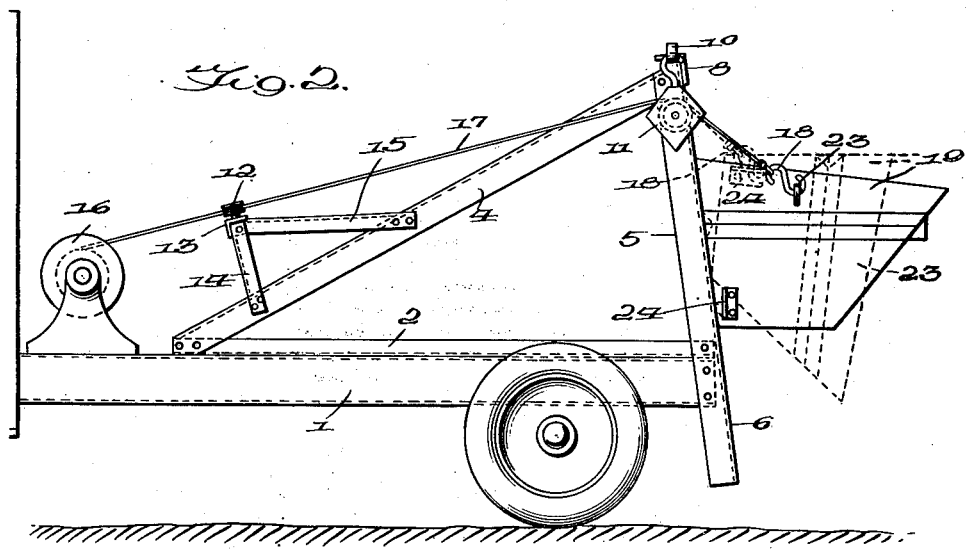

Nov. 24, 1936.　　W. E. LAMBERT　　2,062,227
CONVEYING EQUIPMENT
Filed July 9, 1934　　2 Sheets-Sheet 2
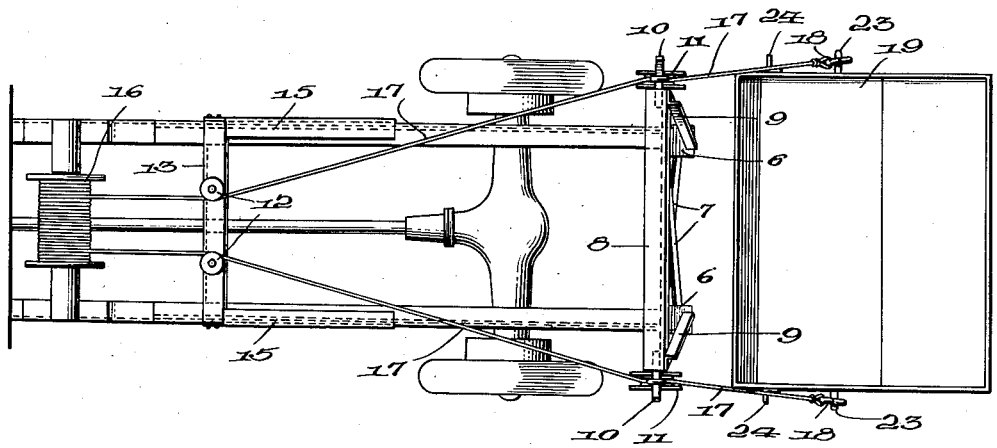
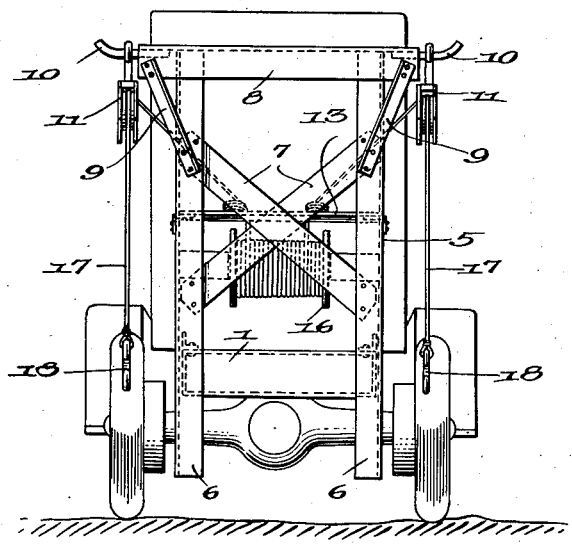
Inventor
Walter E. Lambert
Cyrus Kehr
By
Attorney Patented Nov. 24, 1936

2,062,227

UNITED STATES PATENT OFFICE 2,062,227

CONVEYING EQUIPMENT

Walter E. Lambert, Knoxville, Tenn.

Application July 9, 1934, Serial No. 734,387

17 Claims. (Cl. 214—75)

This invention relates to an improved rig arranged on a truck for the purpose of handling stone and dirt in a quarry, or for transporting material from one place to another. It has been successfully used in the transportation of rock to crushing plants after the rock has been blasted or broken down, and has proved very satisfactory in actual use.

The object of the invention is to save the time of a truck and operator, while the body of the truck is being filled with material, so that the truck does not have to stand and wait during the loading operation.

My invention utilizes a skip adapted to be placed on the ground and loaded after which a truck backs up to the skip, hooks on to it, hoists it sufficient for transportation, and then conveys the skip and its material to a predetermined point, where the material is to be dumped. Provision is made for easy dumping of the material by the hoisting mechanism, which is attached to another part of the skip for turning it over and dumping the contents, after which the skip is returned to a position to be filled and the truck hooks on to another skip and conveys it away while the first one is being filled.

This provides a simple and expedious manner of conveying material from one place to another, effecting a great saving in the use of the trucks and operators, therefore making it unnecessary for them to stand and wait during the loading operation.

In the accompanying drawings,

Fig. 1 is a side elevation of the rear portion of a truck showing the invention applied thereto;

Fig. 2 is a similar view showing the skip in an elevated position;

Fig. 3 is a top plan view thereof;

Fig. 4 is a rear elevation of the truck with the skip removed; and

Fig. 5 is a detail sectional view taken on the line 5—5, of Fig. 1.

I have shown the invention applied to a truck chassis, designated generally by the numeral 1, which has the usual side frame members carrying the rig. The latter comprises side bars 2, riveted, bolted, or otherwise secured as at 3, on the side frame members of the chassis and extending upwardly from the side bars 2, at their forward ends, are brace bars 4, which extend upwardly and rearwardly to the upper end of an upright skid frame 5. The skid frame 5 comprises upright skids 6, attached to the rear of the chassis frame 1 and side bars 2, and extending downwardly to points near the ground. The skids 6 are braced by crossed braces 7, and by a cross bar 8, at their upper ends. The cross bar 8 extends laterally to points outside the skids 6, and has braces 9, extending downwardly from the outer end thereof to the upper portions of the skids 6. The outer ends of the cross bar 8, support pins 10, from which are suspended pulley blocks 11. The braces 9 support the extended ends of the cross bar 8 and also the pins 10 and pulley blocks 11. The spacing of the pulley blocks 11 outside the skids 6 facilitates the pull on the skip and the dumping thereof.

The brace bars 4 also carry near their forward ends, guiding sheaves 12, mounted on an auxiliary frame comprising a cross bar 13, carried on the upper ends of bars 14, which are braced by approximately horizontal bars 15 extending from the upper ends of the bars 14, to the brace bars 4, as shown in Figs. 1 and 2.

Mounted on the truck chassis is a drum 16, driven in any suitable manner as by means of a suitable drive from the truck motor, or if desired this drum 16 may be driven from a separate motor mounted on the chassis with provision for controlling the operation thereof. The drum 16 carries cables 17, wound thereon, so as to operate in unison. If desired, the cables 17 may be of one piece with the middle portion thereof mounted on the drum. The cables 17, pass between the sheaves 12, over the pulley blocks 11, extending downwardly from the latter to attaching devices or detachable fastenings, such as S-hooks 18, as shown.

The rig is adapted to be used in connection with the skip designated generally by the numeral 19. The skip 19 has an open top to receive the material and the side facing the skids 6, designated 20, is inclined to the bottom approximately parallel with the skids while the opposite side 21 is inclined at a smaller acute angle to the horizontal to facilitate dumping. The skip is braced by angle bars 22, which extend along the walls thereof. The opposite sides of the skip 19 are provided with two sets of attaching devices for the S-hooks, 18. Rings 23 are arranged near the upper edges of the sides of the skip and approximately midway from front to back in positions to balance the load during transportation of the skip. Brackets 24 are attached to the side walls near the lower edges thereof and near the back in position to have the S-hooks 18, hooked into these brackets when it is desired to dump the skip.

The skip 19 is adapted to be placed near the dirt or rock to be transported where it is left separate from the truck while it is being filled by the workmen. After being filled the truck containing the rig is backed up to the skip and the hooks 18 are attached to the rings 23. Rotation of the drum 16 in a direction to draw in the cables 17, lifts the skip 19, from the full line position in Fig. 1, to the dotted line position or to a position where the skip rides up along the skids 6 to the desired elevation for transportation and the drum is locked in this position to hold the skip elevated. The truck transports the skip to the place where it is desired to dump the material, as in the case where rock is being transported, at a crushing plant. Then the skip is lowered to the ground and the hooks 18, disengaged from the rings 23, and hooked into the brackets 24. The cables 17 are again drawn in by rotation of the drum 16, which action pulls upward on the back edge of the skip, turning it to the dotted line position in Fig. 2, for effectively dumping all of the contents. Then the emptied skip is hauled back to the point of loading in the same dumping position, and at the loading position the skip is lowered to the ground, unhooked and left to be filled by the workmen. The shape of the skip is such that it automatically rights itself by gravity when set down on the ground, ready for loading. Then the truck backs up to a filled skip for transporting and dumping the latter in the manner just described.

In this way, the truck and the operator thereof, are not kept waiting idle while the workmen are filling the skip or body of a truck, but may be constantly engaged in the transportation of the skips for dumping the material, thereby effecting a considerable saving in operating the trucks and at the same time there is no loss of time on the part of the workmen who might otherwise have to wait for a truck because a number of skips may be made available to be filled one after another and to be handled by means of a very much smaller number of trucks.

It will be noted that the skid frame 5 is inclined sufficiently to act as a support for the skip 19 while the latter is being transported, which aids in holding the skip in place.

I claim:

1. In conveying apparatus, the combination with a rig having cables thereon, each provided with an attaching device at the free end thereof, and means for winding up the cables, of a skip having connections for the cable attaching devices, said connections being disposed near the upper edge of the skip and approximately midway from front to back thereof for supporting the skip during transportation, said skip having separate connections for the cable attaching devices near the back edge thereof and near the bottom for attachment to the skip to cause dumping thereof, the cables being disconnected from the supporting connections and connected with the dumping connections for dumping the skip, the skip being carried wholly by the cables alternately during transportation and during dumping.

2. The combination with a rig having cables carried thereby, each of said cables being provided with an attaching device at the free end thereof, and means for winding up the cables, of a skip having conveying connections for the cable attaching devices located near the top thereof and in position for approximately balancing the load, said skip having dumping connections for the cable attaching devices located near the back edge thereof and near the bottom, the cables being disconnected from the supporting connections and connected with the dumping connections for dumping the skip, the skip being carried wholly by the cables alternately during transportation and during dumping.

3. In a conveying apparatus, the combination with a rig having a pair of cables, each of said cables having a detachable fastening device at the free end thereof, of a container having cable attachments near the upper edge thereof in position for conveying connection with the cable devices, and said container having separate connections near the lower edge thereof in position for attachment to the fastening devices of said cables for dumping the container, the cables being disconnected from the supporting connections and connected with the dumping connections for dumping the skip, the skip being carried wholly by the cables alternately during the transportation and during dumping.

4. In conveying apparatus, the combination with a rig having cables thereon, each of said cables having a detachable fastening hook at the free end thereof, of a skip having rings secured to the sides thereof near the upper edges of said sides in position for detachable fastening with the cable hooks, and brackets secured to the sides of the skip near the lower edge thereof in position for detachable fastening of the cable hooks thereto for dumping the skip, the cables being disconnected from the rings and connected with the brackets for dumping the skip, the skip being carried wholly by the cables alternately during transportation and during dumping.

5. In conveying apparatus, the combination with a rig having cables thereon, each of said cables carrying fastening hooks at the outer ends thereof, of a skip having a flat bottom, an open top and having front and back and end walls, said front wall being inclined at a substantial obtuse angle to the bottom, rings secured to the side walls near the upper edge of the skip in a position for detachable fastening of the cable hooks thereto for conveying the skip, and brackets secured to the end walls near the lower edges thereof and near the back wall in position for detachable fastening of the cable hooks thereto for dumping the skip forwardly over the inclined front wall.

6. In conveying apparatus, a rig comprising an upright skid frame, a cross bar supported at the upper end of said frame and extending laterally to points outside the frame, and means for suspending sheaves at the opposite ends of said cross bar, said means being spaced laterally on the outside of the skid frame.

7. In conveying apparatus, a rig comprising an upright skid frame, a cross bar supported at the upper end of said frame and extending laterally to points outside the frame, and means for suspending sheaves at the opposite ends of said cross bar, said means being spaced laterally on the outside of the skid frame, supporting bars connected to the lower portions of the skid frame, and braces extending between the upper end of the skid frame and the opposite ends of the supporting bars.

8. In conveying apparatus, a rig comprising an upright skid frame, a cross bar supported at the upper end of said frame and extending laterally to points outside the frame, means for suspending sheaves at the opposite ends of said cross bar, said means being spaced laterally on the outside of the skid frame, sheaves suspended from said means, cables extending over said sheaves, a drum receiving the cables, and guiding sheaves for the cables supported by the rig intermediate the first-mentioned sheaves and the drum.

9. In conveying apparatus, the combination of a rig, a skip having a bottom and closed front, back, and end walls, the front wall being inclined away from the back of the skip, cable attachments secured to each of the end walls near the top and near the bottom thereof, the bottom attachments being near the back of the skip, and a single cable for each end of the skip having means for connection with the top attachment for transportation of the skip, and said means being detached from the said top attachments and attached to the bottom attachments for dumping the skip over the inclined front wall.

10. In conveying apparatus, the combination of a rig having a skid frame, a skip arranged to bear upon said skid frame, said skid frame being inclined away from said skip, and the skip having an inclined rear wall extending approximately parallel with the skid frame for partial support of the skip on the skid frame, said skip having a bottom and closed front and end walls, the front wall being inclined away from the rear wall, a pair of cable attachments secured to each of the end walls, one being near the top and the other near the bottom thereof, the bottom attachments being near the back of the skip, and a single cable for each pair of attachments having means for connection with the top attachment for transportation of the skip, and said means being detached from the top attachment and connected with the bottom attachment for dumping the skip.

11. A skip for conveying apparatus having front and rear walls inclined in opposite directions and having end walls and a bottom, said skip having a pair of cable attachments secured to each of the end walls, one attachment being near the top and the other being near the bottom thereof, the bottom attachment being near the back of the skip, for respective engagement alternatively with a cable for transporting and dumping the skip respectively.

12. In conveying apparatus, the combination of a vehicle chassis having a skid frame, a skip arranged to bear against said skid frame, said skid frame being inclined toward the chassis, and the skip having an inclined rear wall extending approximately parallel with the skid frame, said skip having a bottom and closed front and end walls, the front wall being inclined away from the skid frame, a cable attachment secured to each of the end walls near the top thereof, a dumping attachment for the skip adjacent the back thereof and adjacent the bottom, and a cable for each of the cable attachments for transportation of the skip, the dumping attachments being adapted to be engaged by the cables for tilting the skip for dumping.

13. In conveying apparatus, the combination of a motor vehicle chassis having a skid frame thereon, a skip having a flat bottom adapted to rest on the ground during filling, said skip having back and end walls and having a front wall on its opposite side from the skid frame and over which the material is adapted to be dumped, and flexible cable means carried by the vehicle chassis rearwardly of the skip and having means for detachable connections with the end walls of the skip after filling for elevating the same against the skid frame and holding the skip thereagainst during transportation, guide means on the chassis rearwardly of the skip and having the cable means extending forwardly therefrom approximately to the detachable connections, and means for tilting the skip forwardly away from the skid frame for dumping.

14. In conveying apparatus, the combination of a motor vehicle chassis having an inclined skid frame carried entirely thereon, a skip having a flat bottom adapted to rest on the ground during filling, said skip having back and end walls and having an inclined front wall on its opposite side from the skid frame and over which the material is adapted to be dumped, and flexible cable means carried by the vehicle chassis rearwardly of the skip and having means for detachable connections with the end walls of the skip after filling for elevating the skip against the skid frame and holding it thereagainst during transportation, guide means on the chassis rearwardly of the skip and having the cable means extending forwardly therefrom approximately to the detachable connections, and means attached to the end walls of the skip at lower points than the detachable connections and adapted to be engaged for tilting the skip forwardly away from the skid frame for dumping.

15. A skip for conveying apparatus having front and rear walls, end walls, and a flat bottom to rest on the ground during filling, said end walls having means attached thereto adjacent the upper edges thereof in position for detachable fastening of cables for transporting the skip, and said end walls having attachments thereon adjacent the lower portion thereof in position for detachable fastening of means for dumping the skip.

16. In conveying apparatus, the combination of a motor vehicle chassis having a skid frame thereon, a skip having a flat bottom adapted to rest on the ground during filling, said skip having a side wall adapted to slide on said skid frame as said skip is elevated, an opposite wall over which the contained material is adapted to be dumped and end walls, flexible cable means carried by the vehicle chassis and extending rearwardly thereof toward said skid frame, means to which said cable means are connected providing detachable connections with the end walls of said skip, cable-guide means on said chassis forwardly thereof with respect to said skid frame whereby said cable means when elevating said skip along said skid frame holds the skip thereagainst, and means whereby the skip may be tilted away from the skid frame for dumping.

17. In conveying apparatus, the combination of a motor vehicle chassis having an inclined skid frame thereon, a skip having a flat bottom adapted to rest on the ground during filling, said skip having a side wall adapted to slide on said skid frame as said skip is elevated, an opposite inclined wall over which the contained material is adapted to be dumped and end walls, flexible cable means carried by the vehicle chassis and extending rearwardly thereof toward said skid frame, means to which said cable means are connected providing detachable connections with the end walls of said skip, cable-guide means on said chassis forwardly thereof with respect to said skid frame whereby said cable means when elevating said skip along said skid frame holds the skip thereagainst, and means attached to the end walls of the skip at points below the aforementioned detachable connections and adapted to be engaged for tilting the skip away from the skid frame for dumping.

WALTER E. LAMBERT.

DISCLAIMER 2,062,227.—*Walter E. Lambert*, Knoxville, Tenn. CONVEYING EQUIPMENT. Patent dated November 24, 1936. Disclaimer filed December 24, 1940, by the patentee; the assignee, *McMurray Structural Steel Company, Inc.*, concurring.
Hereby enters this disclaimer to claim 15 in said specification.
[*Official Gazette January 21, 1941.*]